United States Patent
Wu et al.

(10) Patent No.: US 11,447,589 B2
(45) Date of Patent: Sep. 20, 2022

(54) TEMPERATURE-RESISTANT AND ANTI-COLLAPSE MULTI-BRANCHED POLYMER FLUID LOSS REDUCER AND PREPARATION METHOD THEREOF

(71) Applicant: YANGTZE UNIVERSITY, Jingzhou (CN)

(72) Inventors: Aibin Wu, Jingzhou (CN); Weichu Yu, Jingzhou (CN); Wenming Shu, Jingzhou (CN); Ying Zhang, Jingzhou (CN); Shanwen Yu, Jingzhou (CN)

(73) Assignee: YANGTZE UNIVERSITY, Jingzhou (CN)

( * ) Notice: Subject to any disclaimer, the term of this patent is extended or adjusted under 35 U.S.C. 154(b) by 212 days.

(21) Appl. No.: 16/716,401

(22) Filed: Dec. 16, 2019

(65) Prior Publication Data
US 2021/0155730 A1     May 27, 2021

(30) Foreign Application Priority Data
Nov. 25, 2019   (CN) .......................... 201911165326.9

(51) Int. Cl.
| | | |
|---|---|---|
| *C09K 8/035* | (2006.01) | |
| *C08F 220/56* | (2006.01) | |
| *C08F 220/58* | (2006.01) | |
| *C09K 8/508* | (2006.01) | |

(52) U.S. Cl.
CPC .......... *C08F 220/56* (2013.01); *C08F 220/58* (2013.01); *C09K 8/5083* (2013.01); *C08F 220/585* (2020.02)

(58) Field of Classification Search
CPC .. C08F 220/56; C08F 220/58; C08F 220/585; C09K 8/5083; C09K 8/508; C09K 8/035; C09K 2208/12
See application file for complete search history.

(56) References Cited

FOREIGN PATENT DOCUMENTS

| | | | |
|---|---|---|---|
| CN | 104292129 | * | 1/2015 |
| CN | 106336479 | * | 1/2017 |

* cited by examiner

*Primary Examiner* — Kumar R Bhushan
(74) *Attorney, Agent, or Firm* — Hemisphere Law, PLLC; Zhigang Ma

(57) ABSTRACT

A main chain of a temperature-resistant and anti-collapse multi-branched polymer fluid loss reducer is composed of the following repeating unit (I):

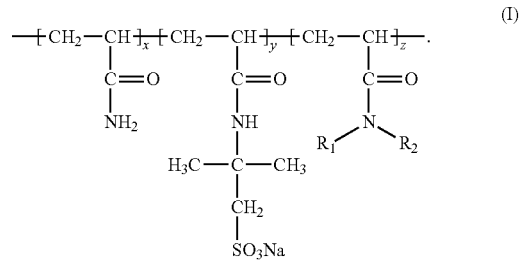

In the repeating unit (I): $x:y:z=(20{\sim}80){:}(20{\sim}80){:}(2{\sim}30)$; the $R_1$ and $R_2$ groups are alkylamines having a multi-branched structure. The beneficial effect of the multi-branched polymer fluid loss reducer is: introducing cheap acrylamide branch monomer into the polymer monomer system of acrylamide and 2-acrylamido-2-methylpropanesulfonic acid, the preparation process is simple, the reaction conditions are mild, and the production cost is significantly reduced.

5 Claims, No Drawings

TEMPERATURE-RESISTANT AND ANTI-COLLAPSE MULTI-BRANCHED POLYMER FLUID LOSS REDUCER AND PREPARATION METHOD THEREOF

FIELD OF THE DISCLOSURE

The disclosure relates to temperature-resistant and anti-collapse multi-branched polymer fluid loss reducer and preparation method thereof.

BACKGROUND

The fluid loss reducer is one of the most commonly used treatment agents in oil and gas field drilling. Its role is to control the fluid loss of the drilling fluid system, reduce the amount of filtrate of drilling fluid entering the formation due to pressure difference, and prevent the filtrate from invading the stratum caused by the formation. Rock hydration and swelling, instability of the well wall, and various complex situations occur, thereby reducing damage to oil and gas layers and formations, especially in deep and ultra-deep well drilling. It is an indispensable key treatment agent for drilling fluid systems.

At present, fluid loss reducer of drilling fluid can be globally divided into natural modified polymers, synthetic resins, and synthetic polymers according to their structure. Naturally modified polymer-type fluid loss reducer, mainly including modified starch, cellulose, lignin, humic acid, lignite, and tannin, have the characteristics of wide sources and low prices, but generally have the weakness of low temperature and salt resistance. Synthetic resin type fluid loss reducer, such as the most commonly used sulfomethyl phenolic resin, is prepared by sulfonation reaction using phenolic resin as the precursor. Although it has good temperature resistance, salt resistance and filtration loss reduction performance, it is easy to cause environmental pollution during preparation and use. There are many types of synthetic polymer fluid loss reducer and their performance can be adjusted, which makes them have incomparable advantages of natural modified polymer and synthetic resin fluid loss reducers. So it is the most widely studied type of fluid loss reducer.

Researchers have designed and synthesized synthetic polymer fluid loss reducer of various structures, such as the introduction of silane (from patent CN106543377), rigid ring (from patent CN106432601), maleic acid (from patent CN105017474), Cation (from patent CN104292387), acrylonitrile (from patent CN103289659), itaconic acid (from patent CN104263329), betaine (from patent CN107033280), zwitterion (from patent CN101691485), polyether (from patent CN106432601), nano calcium Bentonite (from patent CN106366244) and potassium chloride (from patent CN107118749) and other structures, have obtained synthetic polymer fluid loss reducer with different properties. However, the monomer raw materials which have these structural fragments introduced by design are either more expensive and environmentally unfriendly, or the preparation process is cumbersome and the amount is large. Therefore, there is an urgent need to propose a new synthetic polymer fluid loss reducer with simple process and excellent performance to solve the above problems.

SUMMARY

The purpose of the present invention is to provide a temperature-resistant and anti-collapse multi-branched polymer fluid loss reducer and preparation method thereof for solving the problems of complicated preparation process, high cost and harmful environment to the synthetic polymer fluid loss reducer in the prior art.

The main chain of the temperature-resistant and anti-collapse multi-branched polymer fluid loss reducer is composed of the following repeating unit (I):

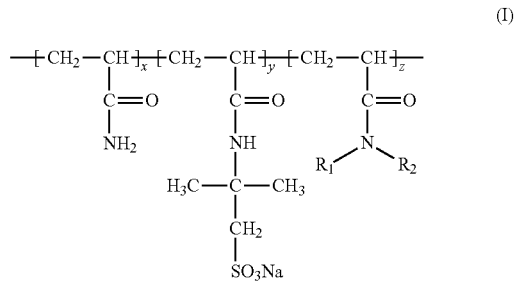

In the repeating unit (I): $x:y:z=(20\sim80):(20\sim80):(2\sim30)$;

When the $R_1$ and $R_2$ groups are different, $R_1$ is —H, $R_2$ is any one of —$(CH_2)_a NH_2$, —$(CH_2)_a N[(CH_2)_b NH_2]_2$, —$(CH_2)_a N[(CH_2)_b N[(CH_2)_c NH_2]_2]_2$, —$(CH_2)_a N[(CH_2)_b N[(CH_2)_c N[(CH_2)_d NH_2]_2]_2]_2$, —$(CH_2)_a N[(CH_2)_b N[(CH_2)_c N[(CH_2)_d N[(CH_2)_e NH_2]_2]_2]_2]_2$; a, b, c, d, e are any integers from 1 to 5;

When the $R_1$ and $R_2$ groups are the same, $R_1$ and $R_2$ is any one of —$(CH_2)_a NH_2$, —$(CH_2)_a N[(CH_2)_b NH_2]_2$, —$(CH_2)_a N[(CH_2)_b N[(CH_2)_c NH_2]_2]_2$, —$(CH_2)_a N[(CH_2)_b N[(CH_2)_c N[(CH_2)_d NH_2]_2]_2]_2$, —$(CH_2)_a N[(CH_2)_b N[(CH_2)_c N[(CH_2)_d N[(CH_2)_e NH_2]_2]_2]_2]_2$; a, b, c, d, e are any integers from 1 to 5.

The preparation method of temperature-resistant and anti-collapse polymer fluid loss reducer, including the following steps:

Adding polymerized monomer raw materials into the solvent, mixing and stirring, and pass in $N_2$ to remove $O_2$ for 30 min to obtain a raw material mixture;

Adding an initiator to the raw material mixture, and initiating the polymerization reaction after heating up to obtain a viscous mixture;

The viscous mixture is subjected to a post-treatment process to obtain a temperature-resistant and anti-collapse multi-branched polymer fluid loss reducer;

The preparation method of temperature-resistant and anti-collapse polymer fluid loss reducer is used for preparing the temperature-resistant and anti-collapse multi-branched polymer fluid loss reducer previously.

The beneficial effect of the technical scheme proposed in the present invention is: introducing cheap acrylamide branch monomer into the polymer monomer system of acrylamide and 2-acrylamido-2-methylpropanesulfonic acid, the preparation process is simple, the reaction conditions are mild, and the production cost is significantly reduced. At the same time, the polymerized monomer does not contain aromatic ring monomers and ionizable monomers, is environmentally friendly, and maintains excellent temperature resistance, salt resistance and anti-collapse properties.

DETAILED DESCRIPTION OF PREFERRED EMBODIMENTS

For the first solution provided by the present invention, it is provided a temperature-resistant and anti-collapse multi-branched polymer fluid loss reducer. The main chain of the temperature-resistant and anti-collapse multi-branched polymer fluid loss reducer is composed of the following repeating unit (I):

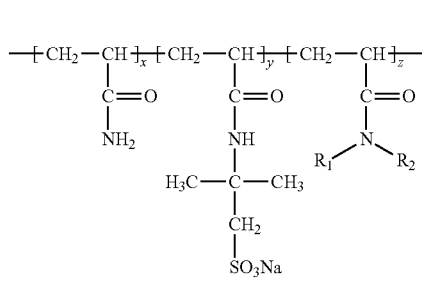

In the repeating unit (I): x:y:z=(20~80):(20~80):(2~30);

When the $R_1$ and $R_2$ groups are different, $R_1$ is —H, $R_2$ is any one of —$(CH_2)_a NH_2$, —$(CH_2)_a N[(CH_2)_b NH_2]_2$, —$(CH_2)_a N[(CH_2)_b N[(CH_2)_c NH_2]_2]_2$, —$(CH_2)_a N[(CH_2)_b N[(CH_2)_c N[(CH_2)_d NH_2]_2]_2]_2$, —$(CH_2)_a N[(CH_2)_b N[(CH_2)_c N[(CH_2)_d N[(CH_2)_e NH_2]_2]_2]_2]_2$; a, b, c, d, e are any integers from 1 to 5;

When the $R_1$ and $R_2$ groups are the same, $R_1$ and $R_2$ is any one of —$(CH_2)_a NH_2$, —$(CH_2)_a N[(CH_2)_b NH_2]_2$, —$(CH_2)_a N[(CH_2)_b N[(CH_2)_c NH_2]_2]_2$, —$(CH_2)_a N[(CH_2)_b N[(CH_2)_c N[(CH_2)_d NH_2]_2]_2]_2$, —$(CH_2)_a N[(CH_2)_b N[(CH_2)_c N[(CH_2)_d N[(CH_2)_e NH_2]_2]_2]_2]_2$; a, b, c, d, e are any integers from 1 to 5.

For the second solution provided by the present invention, it is provided a preparation method of temperature-resistant and anti-collapse polymer fluid loss reducer, including the following steps:

S1: Adding polymerized monomer raw materials into the solvent, mixing and stirring, and pass in $N_2$ to remove $O_2$ for 30 min to obtain a raw material mixture. In this embodiment, the polymerized monomer raw materials include acrylamide, 2-acrylamido-2-methylpropanesulfonic acid, and acryl polybromide, and the molar ratio of the three is (20~80):(20~80):(2~30), further preferably, the molar ratio of the three is (40~60):(40~49):(2~20). The introduction of acryl polybranched amines into the polymerized monomer systems of acrylamide and 2-acrylamido-2-methylpropanesulfonic acid can significantly reduce the production cost, and all three polymerized monomers do not contain aromatic ring monomers and ionizable monomers to avoid harm to the environment. The solvent is one or a mixture of water, methanol, ethanol, isopropanol, tert-butanol, dichloromethane, chloroform, 1,2-dichloroethane, benzene, toluene, xylene, diethyl ether, isopropyl ether, petroleum ether, acetone, tetrahydrofuran, 1,4-dioxane, N, N-dimethylformamide, dimethyl sulfoxide and white oil. Preferably, the solvent is water or a mixed solution composed of water and white oil.

S2: Adding an initiator to the raw material mixture, and initiating the polymerization reaction after heating up to obtain a viscous mixture. In this embodiment, the reaction temperature of the polymerization reaction is 30~80° C., preferably 40~55° C., and the reaction time is 3~12 h, preferably 4~6 h. The reaction conditions are mild and the reaction progress is easy to control. the initiator is azobisisobutyronitrile or a mixture consisting of ammonium persulfate and sodium bisulfite in a 1:1 mass ratio, and the amount of the initiator added is the total mass of the polymerized monomer raw materials 0.01~0.1%.

S3: The viscous mixture is subjected to a post-treatment process to obtain a temperature-resistant and anti-collapse multi-branched polymer fluid loss reducer. Wherein the post-treatment process is: repeatedly immersing the viscous mixture in acetone, washing in ethanol, and then drying and pulverizing, to obtain the temperature-resistant and anti-collapse polymer fluid loss reducer. Since the method for preparing the second solution in the present invention is used to prepare the temperature-resistant and anti-collapse multi-branched polymer fluid loss reducer in the first solution, the temperature-resistant and anti-collapse multi-branched polymer fluid loss reducer in the two solutions should be consistent in structure and performance.

With reference to specific embodiments, the temperature-resistant and anti-collapse multi-branched polymer fluid loss reducer and preparation method thereof of the present invention are further described in detail. In all the following examples, acrylamide is abbreviated as AM and the molecular weight is 71.0, 2-acrylamido-2-methylpropanesulfonic acid is abbreviated as AMPS and the molecular weight is 207.2.

Example 1

Adding (28.2 mmol, 2.00 g) AM, (28.2 mmol, 5.84 g) AMPS, and (6.27 mmol, 2.01 g) $CH_2$=$CHCON[CH_2CH_2N(CH_2CH_2NH_2)_2]_2$ into 30 mL deionized water, passing $N_2$ to remove $O_2$ 30 min. Then adding 0.98 mg of initiator formulated with ammonium persulfate and sodium bisulfite in a 1:1 mass ratio, controlling the temperature at 45° C. to obtain a viscous mixture after 5 hours of reaction. The viscous mixture was immersed in acetone and washed in ethanol several times, and then dried under vacuum at 35° C. for 24 h, and then pulverized to prepare a multi-branched polymer fluid loss reducer I.

Example 2

Adding (34.5 mmol, 2.45 g) AM, (28.2 mmol, 5.84 g) AMPS, and (3.13 mmol, 1.03 g) $CH_2$=$CHCON[CH_2CH_2N(CH_2CH_2NH_2)_2]_2$ into 28 mL deionized water, passing $N_2$ to remove $O_2$ 30 min. Then adding 1.40 mg of initiator formulated with ammonium persulfate and sodium bisulfite in a 1:1 mass ratio, controlling the temperature at 50° C. to obtain a viscous mixture after 6 hours of reaction. The post-treatment process is as described in Example 1 to prepare a multi-branched polymer fluid loss reducer II.

Example 3

Adding (28.2 mmol, 2.00 g) AM, (34.5 mmol, 7.15 g) AMPS, and (6.27 mmol, 2.07 g) $CH_2$=$CHCON[CH_2CH_2N(CH_2CH_2NH_2)_2]_2$ into 45 mL deionized water, passing $N_2$ to remove $O_2$ 30 min. Then adding 1.45 mg of initiator formulated with ammonium persulfate and sodium bisulfite in a 1:1 mass ratio, controlling the temperature at 60° C. to obtain a viscous mixture after 4 hours of reaction. The post-treatment process is as described in Example 1 to prepare a multi-branched polymer fluid loss reducer III.

Example 4

Adding (28.2 mmol, 2.00 g) AM, (14.1 mmol, 2.92 g) AMPS, and (4.70 mmol, 1.55 g) $CH_2$=$CHCON[CH_2CH_2N(CH_2CH_2NH_2)_2]_2$ into 26 mL deionized water, passing $N_2$ to remove $O_2$ 30 min. Then adding 0.78 mg of initiator formulated with ammonium persulfate and sodium bisulfite in a 1:1 mass ratio, controlling the temperature at 42° C. to obtain a viscous mixture after 5 hours of reaction. The post-treatment process is as described in Example 1 to prepare a multi-branched polymer fluid loss reducer IV.

Example 5

Adding (14.1 mmol, 1.00 g) AM, (28.2 mmol, 5.84 g) AMPS, and (4.70 mmol, 1.55 g) $CH_2$=$CHCON[CH_2CH_2N(CH_2CH_2NH_2)_2]_2$ into 30 mL deionized water, passing $N_2$ to remove $O_2$ 30 min. Then adding 1.26 mg of initiator formulated with ammonium persulfate and sodium bisulfite in a 1:1 mass ratio, controlling the temperature at 50° C. to obtain a viscous mixture after 6 hours of reaction. The post-treatment process is as described in Example 1 to prepare a multi-branched polymer fluid loss reducer V.

Example 6

Adding (28.2 mmol, 2.00 g) AM, (28.2 mmol, 5.84 g) AMPS, and (2.97 mmol, 1.10 g) $CH_2$=$CHCONHCH_2CH_2N[CH_2CH_2N(CH_2CH_2NH_2)_2]_2$ into 32 mL deionized water, passing $N_2$ to remove $O_2$ 30 min. Then adding 1.26 mg of initiator formulated with ammonium persulfate and sodium bisulfite in a 1:1 mass ratio, controlling the temperature at 42° C. to obtain a viscous mixture after 5 hours of reaction. The post-treatment process is as described in Example 1 to prepare a multi-branched polymer fluid loss reducer VI.

Example 7

Adding (28.2 mmol, 2.00 g) AM, (38.8 mmol, 8.04 g) AMPS, and (3.53 mmol, 0.71 g) $CH_2$=$CHCONHCH_2CH_2N(CH_2CH_2NH_2)_2$ into 38 mL deionized water, passing $N_2$ to remove $O_2$ 30 min. Then adding 1.29 mg of initiator formulated with ammonium persulfate and sodium bisulfite in a 1:1 mass ratio, controlling the temperature at 46° C. to obtain a viscous mixture after 5 hours of reaction. The post-treatment process is as described in Example 1 to prepare a multi-branched polymer fluid loss reducer VII.

Example 8

Adding (34.9 mmol, 2.48 g) AM, (28.2 mmol, 5.84 g) AMPS, and (4.03 mmol, 0.59 g) $CH_2$=$CHCONHCH_2CH_2CH_2N(CH_2CH_2CH_2NH_2)_2$ into 32 mL deionized water, passing $N_2$ to remove $O_2$ 30 min. Then adding 1.07 mg of initiator formulated with ammonium persulfate and sodium bisulfite in a 1:1 mass ratio, controlling the temperature at 40° C. to obtain a viscous mixture after 5 hours of reaction. The post-treatment process is as described in Example 1 to prepare a multi-branched polymer fluid loss reducer VIII.

Example 9

Adding (34.9 mmol, 2.48 g) AM, (28.2 mmol, 5.84 g) AMPS, and (4.03 mmol, 1.67 g) $CH_2$=$CHCON[CH_2CH_2CH_2N(CH_2CH_2CH_2NH_2)_2]_2$ into 35 mL deionized water, passing $N_2$ to remove $O_2$ 30 min. Then adding 1.20 mg of initiator formulated with ammonium persulfate and sodium bisulfite in a 1:1 mass ratio, controlling the temperature at 42° C. to obtain a viscous mixture after 5 hours of reaction. The post-treatment process is as described in Example 1 to prepare a multi-branched polymer fluid loss reducer IX.

Test Example 1

In order to evaluate the fluid loss reduction effect of the above-mentioned multi-polymer polymer fluid loss reducers prepared in the examples of the present invention, firstly configuring the base slurry according to the national standard GB/T16783-1997, and the specific method is as follows:

Adding 20 g of bentonite and 1 g of anhydrous sodium carbonate to 500 mL of water, stirring at high speed for 30 minutes, and then keeping it in a closed position for 24 h to obtain a fresh water-based slurry with a bentonite content of 4%. Taking 400 mL of this fresh water-based slurry solution and putting it into the ZNS-2 medium pressure dehydration meter to measure the filtration loss within 30 min at 0.7 MPa pressure, which is the filtration loss of the fresh water-based slurry.

Taking 400 mL of fresh water-based slurry, and adding the multi-branched polymer fluid loss reducer I to IX, which account for 1% of the mass of the slurry, and mix them evenly into the ZNS-2 medium pressure dehydration meter, measuring filtration loss within 30 minutes under 0.7 MPa pressure. That is the filtration loss of multi-branched polymer fluid loss reducers in fresh water-based slurry. At the same time, a Dristemp product purchased from Chevron Phillips Chemical Company was used as a comparative test. The test conditions were the same as those described above. The specific test results are shown in Table 1.

TABLE 1

| Filtration loss performance of multi-branches polymer fluid loss reducer in fresh water-based slurry | |
|---|---|
| Slurry Composition | FL/mL |
| Fresh Water-based Slurry | 28.5 |
| Dristemp | 10.7 |
| Multi-branched Polymer Fluid loss reducers I | 5.2 |
| Multi-branched Polymer Fluid loss reducers II | 4.6 |
| Multi-branched Polymer Fluid loss reducers III | 4.9 |
| Multi-branched Polymer Fluid loss reducers IV | 5.5 |
| Multi-branched Polymer Fluid loss reducers V | 4.8 |
| Multi-branched Polymer Fluid loss reducers VI | 4.2 |
| Multi-branched Polymer Fluid loss reducers VII | 5.6 |
| Multi-branched Polymer Fluid loss reducers VIII | 5.4 |
| Multi-branched Polymer Fluid loss reducers IX | 4.5 |

The data in Table 1 clearly shows that the addition of 1% of the multi-branched polymer fluid loss reducer according to the present invention to the fresh water-based slurry can reduce the filtration loss from 28.5 mL to 4.2 to 5.6 mL, while the comparative test is only reduced to 10.7 mL. It shows that the fluid loss reducer for drilling fluid prepared in Examples 1 to 9 can more effectively reduce the filtration loss of fresh water-based slurry. Among them, the multi-branched polymer fluid loss reducer VI in Example 6 has the most significant reduction in the filtration loss of fresh water-based slurry, and it is determined that Example 6 is the best preparation solution.

Test Example 2

Taking 400 mL of fresh water-based slurry, adding 1% of the multi-branched polymer fluid loss reducer VI, which accounts for 1% of the mass of the slurry. Stir evenly at 160~220° C. for 16 h. The ZNS-2 medium pressure dehydration meter measures the filtration loss within 30 minutes at a pressure of 0.7 MPa, that is, the medium pressure filtration loss is 7.0 mL. The GGS71-A high temperature and high pressure dehydration meter measures twice the filtration loss in 30 minutes at a pressure of 3.5 MPa, that is, the high pressure filtration loss is 20.3 mL. When the above Dristemp comparative sample was tested under the same conditions, the high-pressure filtration loss was 32.5 mL. Obviously, the multi-branched polymer fluid loss reducer synthesized in the present invention has better high temperature resistance performance. Compared with the prior art, the multi-branched polymer fluid loss reducer prepared by the present invention is more effective than the aromatic ring polymer.

Test Example 3

Taking 400 mL of fresh water-based slurry, and adding the multi-branched polymer fluid loss reducer VI which accounts for 4% of the mass of the base slurry. The ZNS-2 medium pressure dehydration meter measures the filtration loss within 30 minutes at 0.7 MPa pressure as 1.9 mL. After adding 1% $CaCl_2$) to the mass fraction of the base slurry, the measured filtration loss is 4.5 mL. When the Dristemp comparative sample was tested under the same conditions, the measured filtration loss was 10.9 mL. It can be seen that the multi-branched polymer fluid loss reducer prepared in the embodiment of the present invention has better salt resistance.

Test Example 4

Taking 10 g of sodium bentonite for drilling fluid test at 102~108° C. for 4 h, putting it into a shale expansion bucket, applying 4 MPa pressure on the press and hold it for 5 min. Then it is installed in a shale dilatometer, and measured the swelling height of the immersion core for 7 h after immersion in the 5% KCl solution and 2% multi-branched polymer fluid loss reducer VI solution respectively. The relative inhibition was calculated to be 0.42. The multi-branched polymer fluid loss reducer has good relative inhibitory performance.

Test Example 5

Taking 50 g of air-dried mud shale shavings samples and putting into two high-temperature tanks that have been filled with 350 mL of distilled water and 350 mL of 5% multi-branched polymer fluid loss reducer VI solution. Then rolling in a roller furnace at 77° C. for 16 h. After cooling, pouring them into a 0.45 mm standard sieve (40 mesh) and rinsing with water. Collecting the remaining debris in the sieve in a watch glass, drying at 102~108° C. for 4 h, cooling and putting in air for 24 h. The increase rate of shale recovery calculated by weighing is 90.5%, and the recovery rate of the sample in distilled water is 20 to 40%. It can be seen that the multi-branched polymer fluid loss reducer prepared in the embodiment of the present invention has a good rock recovery improvement rate.

In summary, introducing cheap acrylamide branch monomer into the polymer monomer system of acrylamide and 2-acrylamido-2-methylpropanesulfonic acid, the preparation process is simple, the reaction conditions are mild, and the production cost is significantly reduced. At the same time, the polymerized monomer does not contain aromatic ring monomers and ionizable monomers, is environmentally friendly, and maintains excellent temperature resistance, salt resistance and anti-collapse properties. In the present invention, the relative inhibition of the multi-branched polymer fluid loss reducer is 0.42, the shale recovery improvement rate is 90.5%, the filtration loss is reduced to 4.2 mL, and the temperature resistance reaches 220° C. It has excellent anti-temperature, anti-collapse and filtration loss reduction effects in drilling fluid systems such as fresh water and brine.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A preparation method of a temperature-resistant and anti-collapse polymer fluid loss reducer, including the following steps:

adding polymerized monomer raw materials into a solvent, mixing and stirring, and pass in $N_2$ to remove $O_2$ for 30 min to obtain a raw material mixture;

wherein the polymerized monomer raw materials include a first monomer, a second monomer and a third monomer, the first monomer is acrylamide and the second monomer is 2-acrylamido-2-methylpropanesulfonic acid, and the molar ratio of the first monomer, the second monomer and the third monomer is (20~80):(20~80):(2~30);

adding an initiator to the raw material mixture, and initiating the polymerization reaction after heating up to obtain a viscous mixture;

wherein the initiator is azobisisobutyronitrile or a mixture consisting of ammonium persulfate and sodium bisulfite in a 1:1 mass ratio, and the amount of the initiator added is the total mass of the polymerized monomer raw materials 0.01~0.1%;

wherein the viscous mixture is subjected to a post-treatment process to obtain a temperature-resistant and anti-collapse multi-branched polymer fluid loss reducer;

wherein the post-treatment process is: repeatedly immersing the viscous mixture in acetone, washing in ethanol, and then drying and pulverizing;

wherein the main chain of the temperature-resistant and anti-collapse multi-branched polymer fluid loss reducer is composed of the following repeating unit (I):

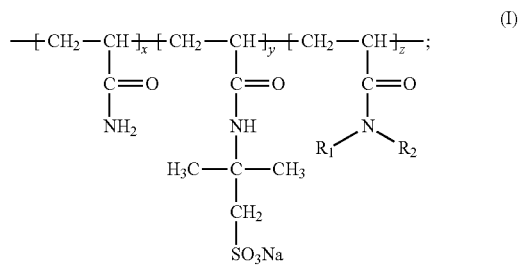

when the $R_1$ and $R_2$ groups are different, $R_1$ is —H, $R_2$ is any one of —$(CH_2)_aNH_2$—$(CH_2)_aN[(CH_2)_bNH_2]_2$, —$(CH_2)_aN[(CH_2)_bN[(CH_2)_cNH_2]_2]_2$; —$(CH_2)_aN[(CH_2)_bN[(CH_2)_cN[(CH_2)_dNH_2]_2]_2]_2$, —$(CH_2)_aN$

[(CH$_2$)$_b$N[(CH$_2$)$_c$N[(CH$_2$)$_d$N[(CH$_2$)$_e$NH$_2$]$_2$]$_2$]$_2$]$_2$; a, b, c, d, e are any integers from 1 to 5;

when the R$_1$ and R$_2$ groups are the same, R$_1$ and R$_2$ is any one of —(CH$_2$)$_a$NH$_2$, —(CH$_2$)$_a$N[(CH$_2$)$_b$NH$_2$]$_2$, —(CH$_2$)$_a$N[(CH$_2$)$_b$N[(CH$_2$)$_c$NH$_2$]$_2$]$_2$, —(CH$_2$)$_a$N[(CH$_2$)$_b$N[(CH$_2$)$_c$N[(CH$_2$)$_d$NH$_2$]$_2$]$_2$]$_2$, —(CH$_2$)$_a$N[(CH$_2$)$_b$N[(CH$_2$)$_c$N[(CH$_2$)$_d$N[(CH$_2$)$_e$NH$_2$]$_2$]$_2$]$_2$]$_2$; a, b, c, d, e are any integers from 1 to 5;

wherein the third monomer is the polymerized monomer raw material which forms

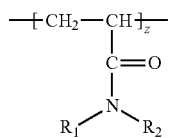

of the repeating unit (I).

2. The preparation method of a temperature-resistant and anti-collapse polymer fluid loss reducer according to claim 1, wherein the molar ratio of the first monomer, the second monomer and the third monomer is (40~60):(40~49):(2~20).

3. The preparation method of a temperature-resistant and anti-collapse polymer fluid loss reducer according to claim 2, wherein the solvent is one or a mixture of water, methanol, ethanol, isopropanol, tert-butanol, dichloromethane, chloroform, 1,2-dichloroethane, benzene, toluene, xylene, diethyl ether, isopropyl ether, petroleum ether, acetone, tetrahydrofuran, 1,4-dioxane, N,N-dimethylformamide, dimethyl sulfoxide and white oil.

4. The preparation method of a temperature-resistant and anti-collapse polymer fluid loss reducer according to claim 2, wherein the solvent is water or a mixed solution composed of water and white oil.

5. The preparation method of a temperature-resistant and anti-collapse polymer fluid loss reducer according to claim 1, wherein the reaction temperature of the polymerization reaction is 30~80° C., and the reaction time is 3~12 h.

* * * * *